US011614402B2

(12) United States Patent
Makowiecki et al.

(10) Patent No.: US 11,614,402 B2
(45) Date of Patent: Mar. 28, 2023

(54) BASELINE-FREE QUANTITATIVE ABSORPTION SPECTROSCOPY (71) Applicant: The Regents of the University of Colorado, a body corporate, Denver, CO (US)

(72) Inventors: Amanda Makowiecki, Boulder, CO (US); Ryan Cole, Boulder, CO (US); Nazanin Hoghooghi, Boulder, CO (US); Greg Rieker, Boulder, CO (US)

(73) Assignee: THE REGENTS OF THE UNIV. OF COLORADO, A BODY CORP., Denver, CO (US)

( * ) Notice: Subject to any disclaimer, the term of this patent is extended or adjusted under 35 U.S.C. 154(b) by 500 days.

(21) Appl. No.: 16/813,495

(22) Filed: Mar. 9, 2020

(65) Prior Publication Data
US 2020/0284723 A1    Sep. 10, 2020

Related U.S. Application Data (60) Provisional application No. 62/815,241, filed on Mar. 7, 2019.

(51) Int. Cl.
*G01N 21/39* (2006.01)
*G01N 21/359* (2014.01)
(Continued)

(52) U.S. Cl.
CPC ............... *G01N 21/39* (2013.01); *G01J 3/28* (2013.01); *G01N 21/274* (2013.01); *G01N 21/3504* (2013.01); *G01N 21/359* (2013.01)

(58) Field of Classification Search
CPC .. G01N 21/39; G01N 21/274; G01N 21/3504; G01N 21/359; G01J 3/28; G01J 3/42
See application file for complete search history.

(56) References Cited

U.S. PATENT DOCUMENTS 8,748,822 B1 * 6/2014 Gerecht et al. .... G01N 21/3586
250/339.07

FOREIGN PATENT DOCUMENTS

CN    106568508 A  *  4/2017  ............... G01J 3/42

OTHER PUBLICATIONS

Cole et all., Baseline-free quantitative absorption spectroscopy based on cepstral analysis, Dec. 23, 2019, Optics Express, vol . 27, No. 26, pp. 37921-37927 (Year: 2019)*

* cited by examiner

*Primary Examiner* — Christine S. Kim
(74) *Attorney, Agent, or Firm* — Lathrop GPM LLP (57) ABSTRACT

A system for recording transmission spectra of a sample with a spectrometer that produces baseline-free molecular response signal. A method for producing baseline-free signals includes applying a logarithmic function to a measured transmission spectrum to form an intermediate spectrum. Applying an inverse Fourier transform to the intermediate spectrum generates a modified free-induction-decay (m-FID) signal, which allows for the separation of molecular absorption features from baseline effects present in the m-FID signal. A weighting function is then applied that suppresses temporal portions of the m-FID signal that correspond to sources of baseline fluctuations as well as periodic effects (e.g. etalons). The method generates a baseline-suppressed m-FID signal that is converted to an absorption spectrum, which exhibits suppressed contributions from baseline fluctuations and periodic effects. When this method is combined with a spectral fitting model it generates measurements of physical properties of the sample without requiring correction for the light source intensity.

19 Claims, 11 Drawing Sheets

(51) Int. Cl.
*G01N 21/3504* (2014.01)
*G01J 3/28* (2006.01)
*G01N 21/27* (2006.01)

BASELINE-FREE QUANTITATIVE ABSORPTION SPECTROSCOPY

CROSS REFERENCE TO RELATED APPLICATIONS

This application claims priority to U.S. Patent Application No. 62/815,241, titled "BASELINE-FREE QUANTITATIVE ABSORPTION SPECTROSCOPY" and filed Mar. 7, 2019, which is incorporated herein by reference in its entirety.

BACKGROUND

Absorption spectroscopy is an important technique for quantitative, nonintrusive measurement in a variety of systems. Molecular absorption spectroscopy measures the amount of light absorbed at frequencies resonant with molecular quantum state transitions. In sensing applications, the magnitude and shape of the measured absorption signatures can be fit with a model of the expected absorption as a function of the environmental conditions (e.g. temperature, pressure, and absorber concentration) to obtain a measurement of the conditions in the sample gas.

SUMMARY

Quantitative comparison of a measured transmission spectrum to a fitting model requires that the measured spectrum be normalized by the non-absorbing intensity spectrum of the light source, also known as the baseline intensity. Baseline intensity is affected by many factors including power fluctuations of the light source (with respect to time and wavelength), sensitivity variations of the detector (with respect to time and wavelength), and other sources that can affect the system transmission, such as scatter, beam steering, etalons, and broad absorption by gases that may be in the beam path. In order to obtain meaningful measurements using absorption spectroscopy, an accurate measurement of the molecular absorption signatures is critical, but such measurement depends heavily on the myriad factors that contribute to the baseline intensity within the spectrum. Many convention techniques used to mitigate baseline effects in absorption spectra add significant complication to experimental design and data processing.

In an embodiment, a method for baseline-free absorption spectroscopy includes applying a logarithm function to a measured transmission spectrum of a sample to form an intermediate spectrum. The method also includes applying an inverse Fourier transform to the intermediate spectrum to generate a modified free induction decay (m-FID) signal. The method also includes weighting the m-FID signal with a weighting function to suppress at least an early temporal portion of the m-FID signal subject to baseline effects, to generate a baseline-suppressed m-FID signal. In an embodiment, the weighting function can be applied to the In an embodiment, a software product for baseline-free absorption spectroscopy includes computer-readable media storing machine-readable instructions. The machine-readable instructions include logarithmic transformation instructions that, when executed by a processor, control the processor to apply a logarithmic function to a measured transmission spectrum of a sample to form an intermediate spectrum. The machine-readable instructions further include free-induction-decay transformation instructions that, when executed by the processor, cause the processor to generate a modified free-induction-decay (m-FID) signal by applying an inverse Fourier transform to the intermediate spectrum. The instructions further include weighting instructions that when executed by the processor, cause the processor to weight the m-FID signal with a weighting function to suppress at least an early temporal portion of the m-FID signal subject to baseline effects to generate a baseline-suppressed m-FID signal.

In an embodiment, a system for baseline-free absorption spectroscopy includes a spectrometer for recording a transmission spectrum of a sample, a memory for storing the software product described above, and a processor for executing the machine-readable instructions of the software product to generate the baseline-suppressed modified free induction decay (m-FID) signal from the transmission spectrum, as recorded by the spectrometer.

BRIEF DESCRIPTION OF THE DRAWINGS

FIG. 12 (a) shows, according to and embodiment, a m-FID signal, a model m-FID signal and a residual m-FID signal, each plotted with respect to a common time axis. FIG. 12 (b) shows, according to an embodiment, an intermediate spectrum, a residual spectrum, and a model spectrum, each plotted with respect to a common time axis.

DETAILED DESCRIPTION OF THE EMBODIMENTS

Figure 1:
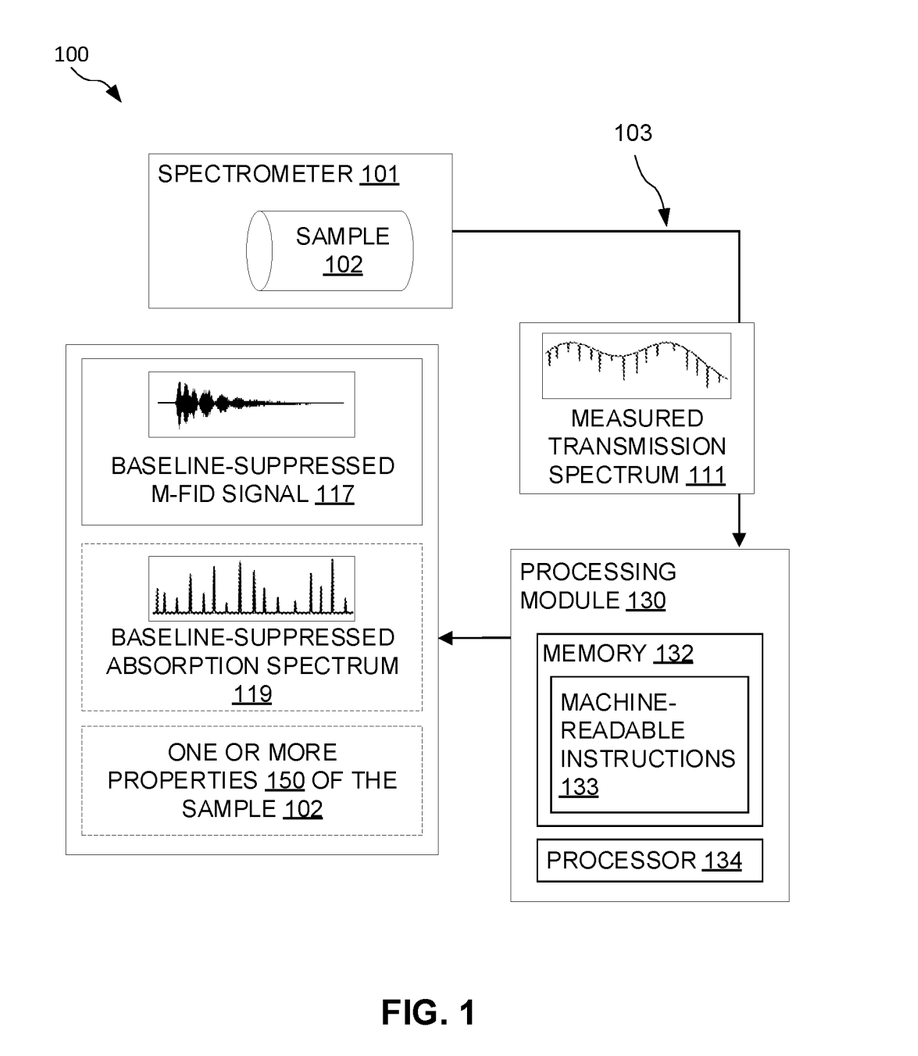
FIG. 1 illustrates a system for performing baseline-free absorption spectroscopy by recording a measured transmission spectrum of a sample with a spectrometer and generating a baseline-suppressed modified free induction decay signal, according to an embodiment.

FIG. 1 illustrates a system 100 for performing baseline-free absorption spectroscopy by recording a measured transmission spectrum 111 of a sample 102 with a spectrometer 101 and generating a baseline-suppressed modified free induction decay (m-FID) signal 117. The measured transmission spectrum 111 is sent through a data connection 103 to a processing module 130 that includes a memory 132 storing machine-readable instructions 133, such as machine-readable instructions in the form of software and/or firmware, and a processor 134. The processor 134 is configured to execute the machine-readable instructions 133 to produce the baseline-suppressed (m-FID) signal 117. The baseline-suppressed m-FID 117 advantageously exhibits reduced baseline effects including at least laser power fluctuations. The machine-readable instructions 133 are further configured, when executed by a processor 134, to produce a baseline-suppressed absorption spectrum 119, which has reduced baseline fluctuations but will exhibit a distortion. The machine-readable instructions 133 are further configured, when executed by the processor 134, to determine one or more properties 150 of the sample 102, which may include physical properties of interest about the sample.

Figure 2:
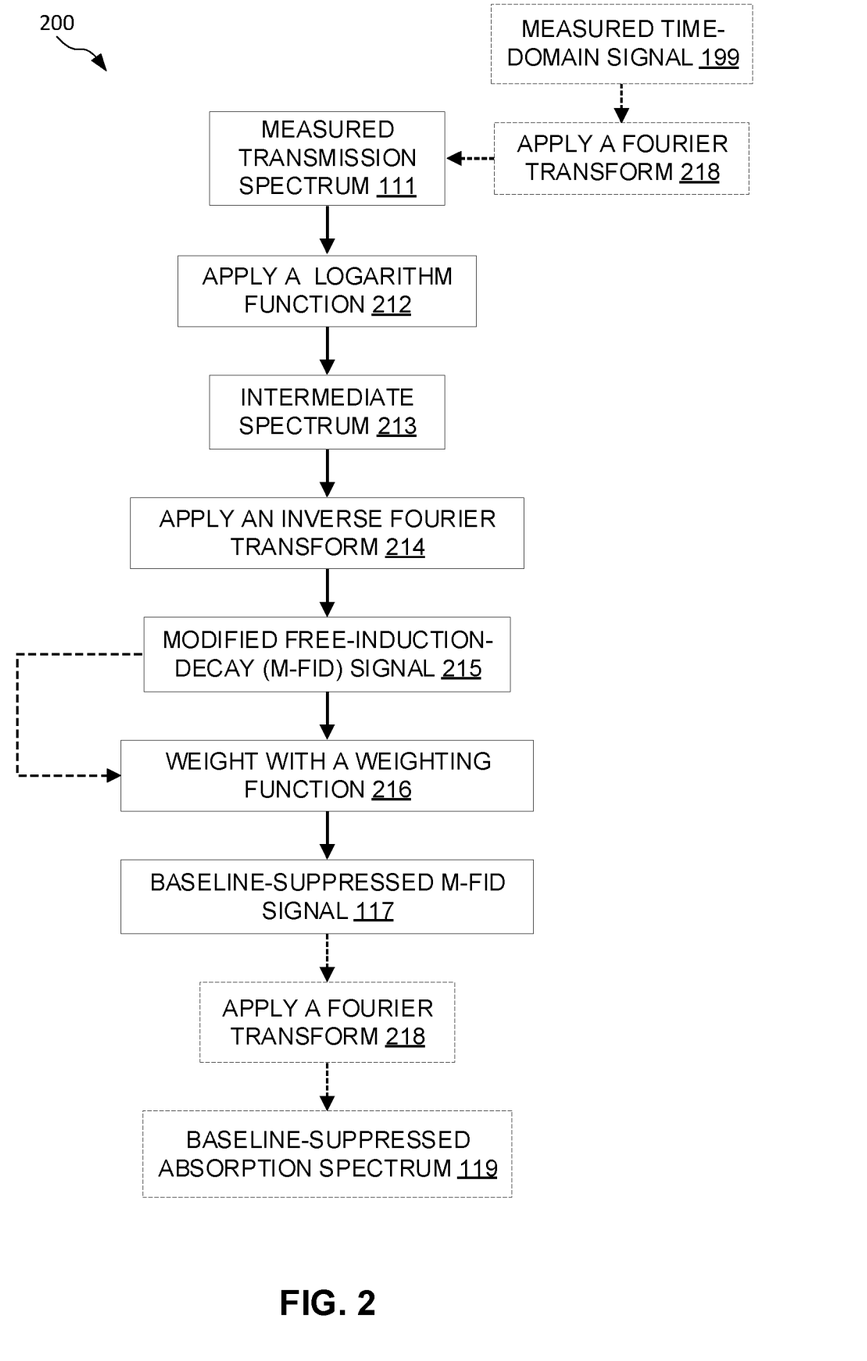
FIG. 2 illustrates a method for generating a baseline-suppressed modified free induction decay signal from a measured transmission spectrum, according to an embodiment.

FIG. 2 illustrates a method 200 for generating the baseline-suppressed m-FID 117 from the measured transmission spectrum 111. In some embodiments, method 200 is at least partially performed by system 100 of FIG. 1. The method 200 includes applying a logarithm function 212 to the measured transmission spectrum 111 to generate an intermediate spectrum 213. Then, by applying an inverse Fourier Transform 214 to the intermediate spectrum 213, a modified free induction (m-FID) signal 215 is generated. The m-FID signal 215, when weighted by a weighting function 216, results in the baseline-suppressed m-FID signal 117. In an embodiment, this baseline-suppressed m-FID signal 117 is converted to the baseline-suppressed absorption spectrum 119 by applying a Fourier transform 218. In an embodiment, the spectrometer records a measured time-domain signal 199 rather than a measured transmission spectrum 111. Applying a Fourier transform 218 to the measured time-domain signal 199 generates a measured transmission spectrum 111. In an embodiment, the transmission spectrum 111, and thus the intermediate spectrum 213, do not have uniform point spacing along the frequency axis and need to be resampled to give uniform point spacing. In an embodiment, weighting with the weighting function 216 includes at least partially deriving the weighting function from the modified free-induction-decay (m-FID) signal 215.

Figure 3:
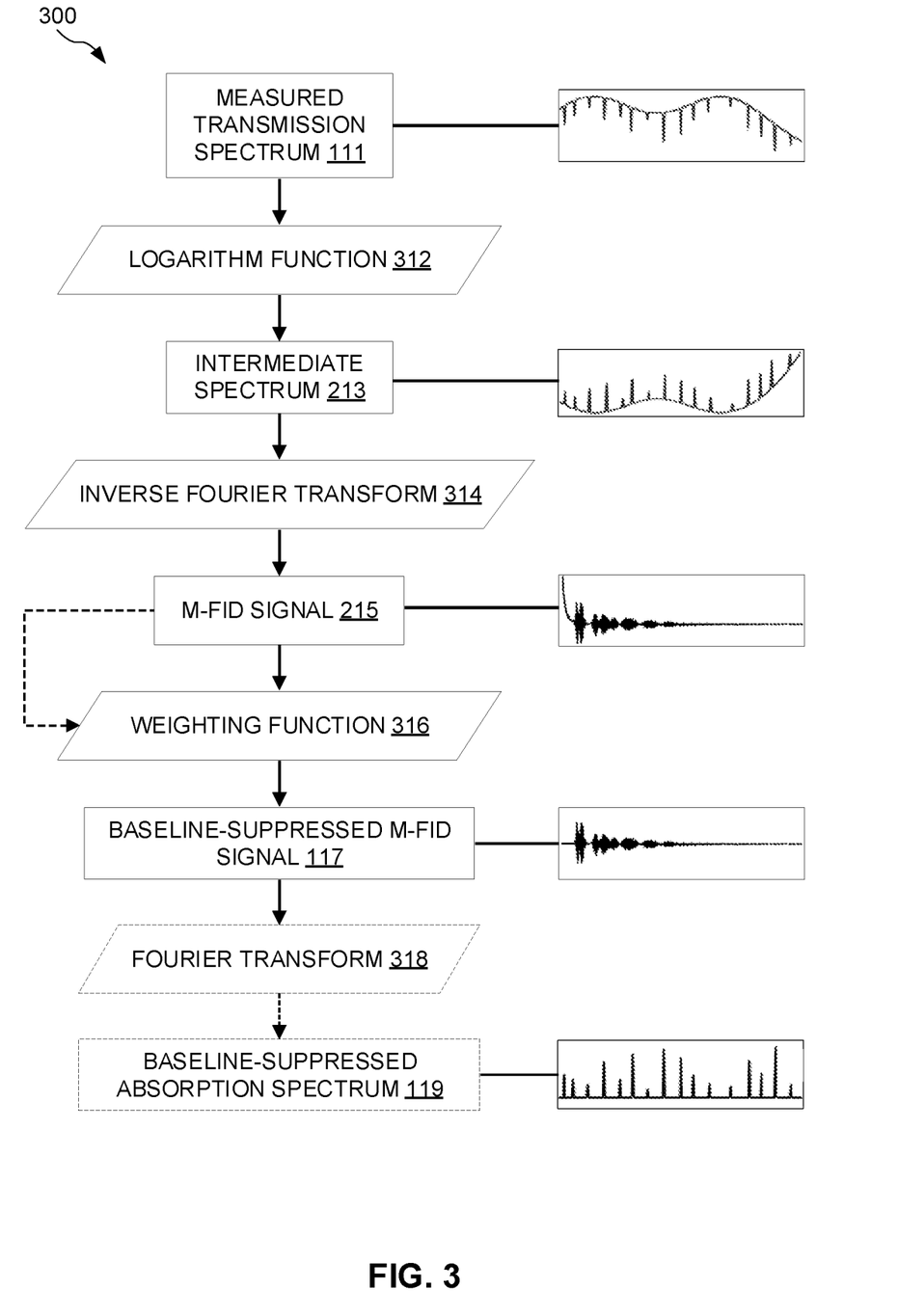
FIG. 3 is a visualization of an example data flow through the method that converts a measured transmission spectrum to a baseline-suppressed m-FID signal, according to an embodiment.

FIG. 3 is a visualization 300 illustrating how the method 200 can be used to convert the measured transmission spectrum 111 to the baseline-suppressed m-FID signal 117. The data flow of FIG. 3 is realized, for example, by system 100 of FIG. 1. The measured transmission spectrum 111 is operated on by a logarithm function 312 to produce an intermediate spectrum 213. In an embodiment, the intermediate spectrum 213 may be multiplied by negative one (−1) to produce a conventional absorbance spectrum. The intermediate spectrum 213 is operated on by an inverse Fourier Transform 314 to generate the m-FID signal 215. The m-FID signal 215 has contributions from both a molecular response in the form of direct absorption of light 1111 (as described with respect to FIG. 11 below) by the sample 102 but also from baseline effects including at least power fluctuations of the light source 1110 (as described with respect to FIG. 11 below), both with respect to time and with respect to the wavelength of light 1111. A benefit of generating the m-FID signal 215 includes that the molecular response is temporally separated from the sources of baseline fluctuations. As a result, the system 100 is capable of selectively removing the contributions to the m-FID signal 215 that result from baseline effects. These baseline effects correspond to the earlier temporal portion 710 (as described with respect to FIG. 7 below) of the m-FID signal 215. By applying a weighting function 316, it is possible to selectively suppress the baseline effects and create the baseline-suppressed m-FID signal 117. This spectrum can be used to provide quantitative measurements of one or more properties 150 of the sample 102 that were not possible initially due to contributions from the baseline that were present in the measured transmission spectrum 111. In an embodiment, the weighting function 316 is at least partly derived from the m-FID signal 215 to select what weight is received by regions of the m-FID signal 215. In an embodiment, a Fourier transform 318 is applied to the baseline-suppressed m-FID signal 117 to generate the baseline-suppressed absorption spectrum 119 with the contributions from baseline fluctuations attenuated. The baseline-suppressed absorption spectrum 119 will exhibit distortion resulting from applying a Fourier transform 318 to the weighted m-FID signal 215. The weighting function 316 alters the m-FID signal 215 in such a way that it adds additional features to the baseline-suppressed absorption spectrum 119 generated by applying a Fourier transform 218. This distortion may be desirable to the baseline contributions present in the measured transmission spectrum 111.

Figure 4:
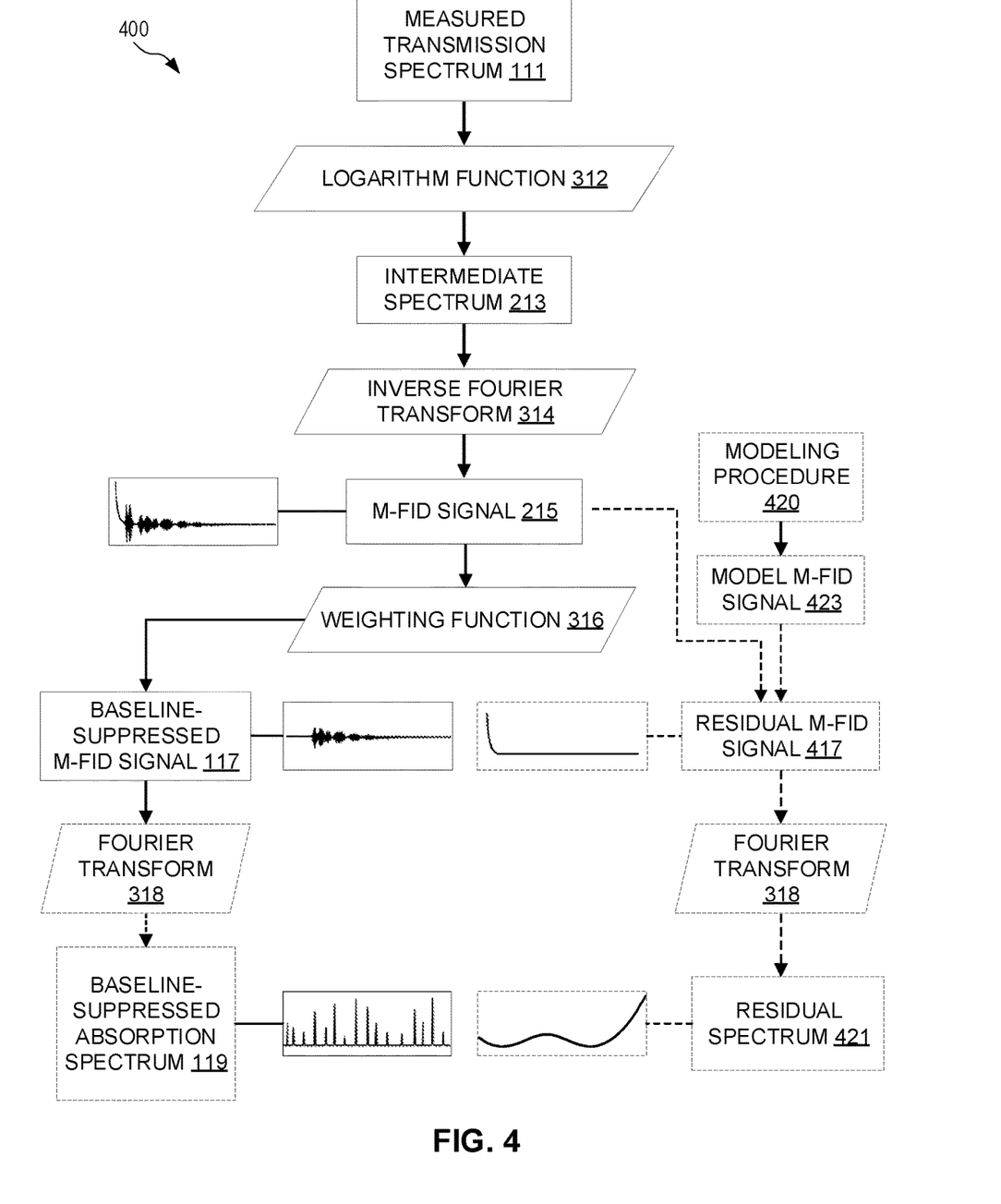
FIG. 4 is a visualization of an example data flow through the method that converts a measured transmission spectrum into a residual modified free induction decay signal and a residual spectrum, according to an embodiment.

FIG. 4 is a visualization 400 of an example data flow through method 200 that converts the measured transmission spectrum 111 into a residual m-FID signal 417 and a residual spectrum 421. The data flow of FIG. 4 is realized, for example, by system 100 of FIG. 1. The measured transmission spectrum 111 is processed to the baseline-suppressed absorption spectrum 119 as indicated in FIG. 3. In addition, FIG. 4 illustrates the generation of the residual m-FID signal 417, which is formed by subtracting a model m-FID signal 423 from the m-FID signal 215, thus isolating the contributions from baseline effects. The model m-FID signal 423 is generated from a modeling procedure 420 described in more detail below. The residual m-FID signal 417 is operated on by a Fourier transform 318 to form the residual spectrum 421. Both the residual m-FID signal 417 and the residual spectrum 421 can provide useful information for characterizing both the sample 102 and the spectrometer 101 itself, as well as can indicate the quality of the modeling procedure 420 used to generate the model m-FID signal 423. In addition, if there are chemical species present in the sample that are not accounted for in the modeling procedure 420, spectral signals of these species will be identifiable in the residual spectrum 421. This is useful in identifying unknown or unexpected species present in the sample. Finally, periodic contributions to the baseline from, for example, an etalon, can be identified in the residual m-FID signal 417. Such periodic baseline contributions can be very broad and difficult to remove from absorption spectra and transmission spectra but are temporally distinct in the residual m-FID signal 417.

Figure 5:
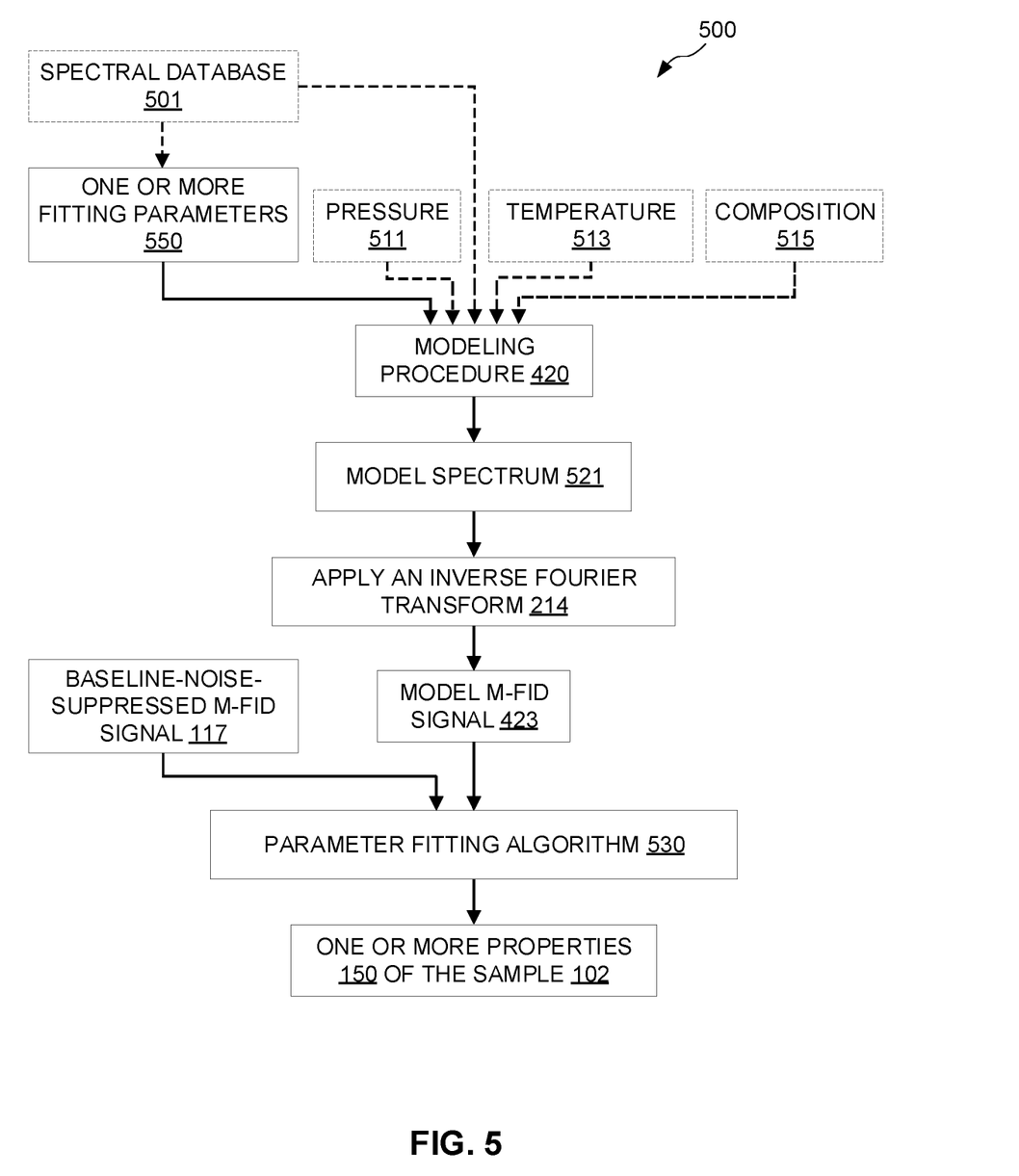
FIG. 5 illustrates a method for generating a model modified free induction decay signal that can be fit to a baseline-suppressed modified free induction decay signal using a parameter fitting algorithm to determine one or more properties of the sample, according to an embodiment.

FIG. 5 illustrates a method 500 for generating the model m-FID signal 423 that can be fit to the baseline-suppressed m-FID signal 117 using a parameter fitting algorithm 530 to determine one or more properties 150 of the sample 102. In some embodiments, method 500 is performed by the system 100 of FIG. 1. One or more fitting parameters 550 are entered into the modeling procedure 420. In one embodiment, the modeling procedure 420 also receives inputs associated with physical quantities that describe the sample 102 such as at least pressure 511, temperature, 513, and composition 515. In an embodiment data from a spectral database 501 may also be inputted directly into the modeling procedure 420. The fitting parameters 550 may also include information from the spectral database 501. The modeling procedure 420 produces a model spectrum 521. Applying an inverse Fourier transform 214 to the model spectrum 521 produces the model m-FID signal 423. Entering the model m-FID signal 423 and the baseline-suppressed m-FID signal 117 into the parameter fitting algorithm 530 produces one or more properties 150 of the sample 102. In an embodiment, the parameter fitting algorithm 530 is a Levenberg-Marquardt algorithm and the model m-FID signal 423 is generated using data from the high-resolution transmission (HITRAN) molecular absorption database that is entered using the HITRAN Application Programming Interface (HAPI). In an embodiment, the one or more properties 150 of the sample 102 are chosen from pressure, temperature, concentration, number density, line strength, linewidth, transition frequency, optical pathlength, doppler width, and molecular velocity. In an embodiment, the optimized values derived for the one or more fitting parameters 550 generated by the parameter fitting algorithm 530 are used to generate the model spectrum 521 that is thus fit to baseline-suppressed m-FID signal 117. In an embodiment, a baseline-suppressed absorbance spectrum 119 can be used for fitting rather than the baseline-suppressed m-FID signal 117. To do so, the model m-FID signal 423 is weighted with the weighting function 316 and then is subjected to a Fourier Transform 318 before being input into the fitting algorithm 530. This serves to compensate for the distortion that is added to the baseline-suppressed absorbance spectrum 119 when the Fourier transform 318 is applied to the baseline-suppressed m-FID signal 117.

Figure 6:
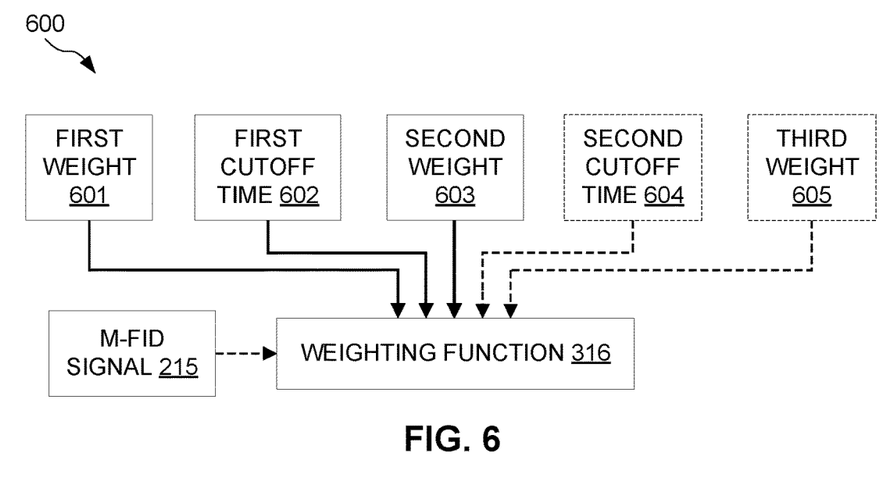
FIG. 6 illustrates a method for generating the weighting function, which requires a first weight, a first cutoff time, and a second weight, according to an embodiment.
Figure 7:
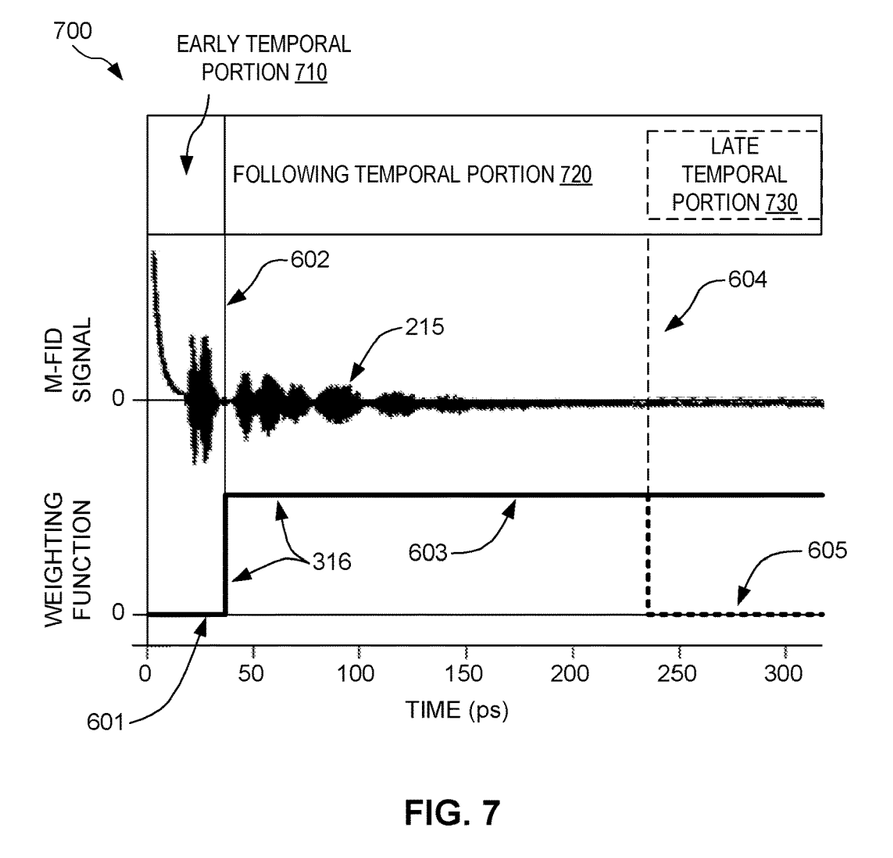
FIG. 7 shows an example modified free induction decay signal plotted on the same time axis as the weighing function, according to an embodiment.

FIG. 6 illustrates a method 600 for generating the weighting function 316, which requires a first weight 601, a first cutoff time 602, and a second weight 603. These inputs are illustrated in FIG. 7, which shows an example m-FID signal 215 plotted on the same time axis as the weighing function 316. Method 600 is performed, for example, by system 100 of FIG. 1. The top of FIG. 7 indicates an early temporal portion 710 of the m-FID signal 215 and a following temporal portion 720 of the m-FID signal 215, which begins at the first cutoff time 602. The weighting function 316 has the first weight 601 for times less than the first cutoff time 602, corresponding to the early temporal portion 710. Times beginning at the first cutoff time and later are weighted with the second weight 603, corresponding to the following temporal portion 720. In an embodiment, the first cutoff time is at least partly derived using the m-FID signal 215. In an embodiment, the weighting function suppresses a late temporal portion 730 of the m-FID signal associated with a low signal-to-noise ratio of the m-FID signal 215. Suppressing the m-FID signal corresponding to the late temporal portion 730 reduces high-frequency noise in the measured transmission spectrum 111. A second cutoff time 604 is used to establish the start of the late temporal portion 730, which receives a third weight 605 that is lower than the second weight 603, the second cutoff time 604 being later than the first cutoff time 602. In embodiments, a fixed value or a mathematical function that depends on time are used to determine of any of the first weight 601, the second weight 603, and the third weight 605.

Figure 8:
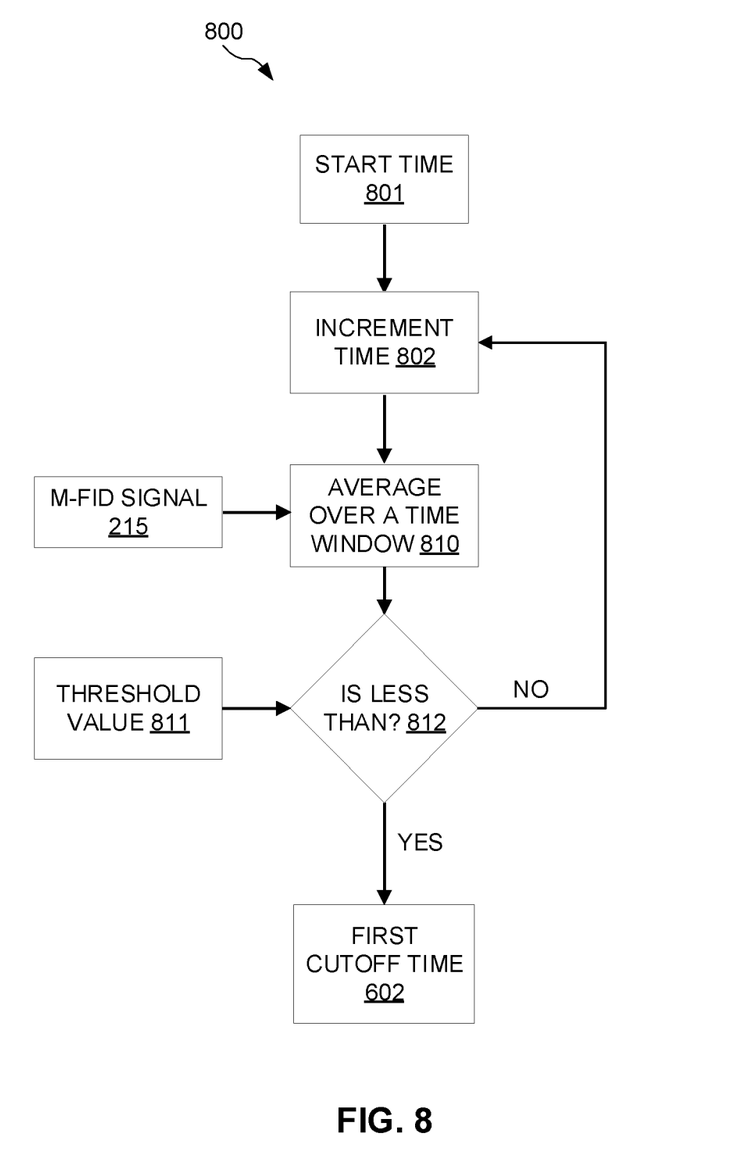
FIG. 8 illustrates a method for determining the first cutoff time by calculating a lowest time for which an average over a time window of the modified free induction decay signal is less than a threshold value, according to an embodiment.

FIG. 8 illustrates a method 800 for determining the first cutoff time 602 by calculating a lowest time for which an average over a time window 810 of the m-FID signal 215 is less than a threshold value 811. In some embodiments, method 800 is performed by system 100 of FIG. 1. In an embodiment, the method 800 uses the start time 801 that corresponds to the earliest point of the m-FID signal 215. An increment time 802 establishes a second time point and thus introduces a time window that is bound by the start time 801 and the second time point. Then the average of the m-FID signal 215 over the time window 810 will produce a value, which can be mathematically compared to a threshold value 811. If the average over a time window is not less than the threshold value 811, the method increments time 802 again, which effectively shifts the time window to later times. The method then creates a new average over the time window 810 and calculates if it is less than 812 the threshold value 811. This loop continues until the average over a time window 810 is less than 812 the threshold value 811, at which point, the second time point is recorded as the first cutoff time 602.

Figure 9:
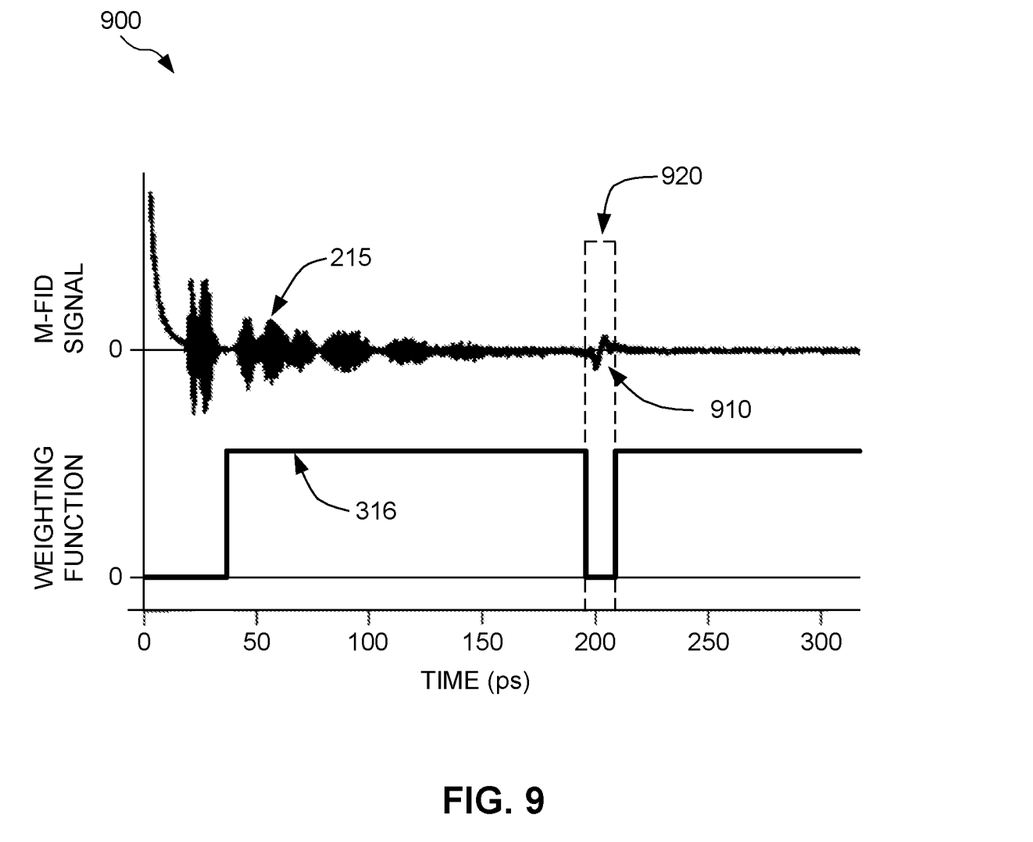
FIG. 9 illustrates an example modified free induction decay signal that, in an embodiment, exhibits a periodic baseline contribution over a temporal portion of the modified free induction decay signal and further illustrates the weighting function plotted with respect to the same time axis.

FIG. 9 illustrates an example m-FID signal 215 that, in an embodiment, exhibits a periodic baseline contribution 910 over a temporal portion 920 of the m-FID signal 215 and further illustrates the weighting function 316 plotted with respect to the same time axis. In the measured transmission spectra 111, there may be contributions that cause periodic oscillations in the baseline. Such periodic baseline effects may result from light undergoing multiple reflections in a planar optic such as a window. In transmission spectra, it if often difficult to remove periodic contributions to the baseline because the spectral features are broad and may span large regions of the spectrum, thus overlapping other spectral features. An advantage to generating the m-FID signal 215 is that the periodic baseline contribution 910 is isolated and distinct temporally from molecular absorption contributions, making it straightforward to isolate and remove these contributions. In FIG. 9, the feature of the m-FID signal 215 found within the temporal region 920 is due to a periodic baseline contribution and is straightforward to identify. By adjusting the weighting function 316 to reduce the weight over the temporal region, the periodic baseline contribution 910 will be suppressed in the baseline-suppressed m-FID signal 117 generated from the weighted m-FID signal 215. In an embodiment, there exist multiple instances in the m-FID signal 215 of the periodic baseline contribution 910 that are each suppressed by adjusting the weighting function 316 to lower the weight over each corresponding temporal window 920.

Figure 10:
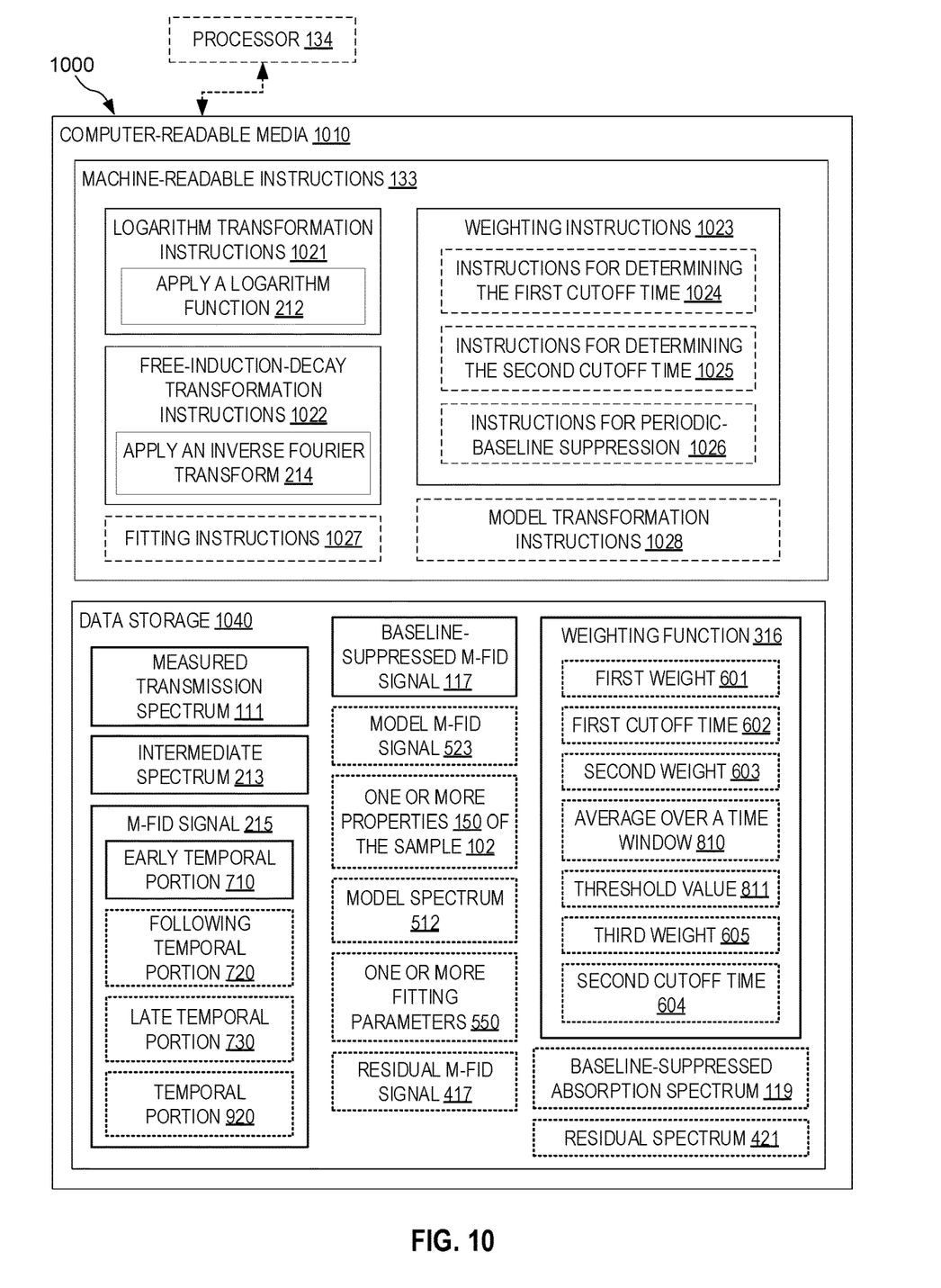
FIG. 10 illustrates a software product for baseline-free absorption spectroscopy that includes computer-readable media storing machine-readable instructions that, when executed by a processor, generate at least a baseline-suppressed modified free induction decay signal, according to an embodiment.

FIG. 10 illustrates a software product 1000 for baseline-free absorption spectroscopy that includes computer-readable media 1010 storing machine-readable instructions 133 that, when executed by the processor 134, generate at least the baseline-suppressed m-FID signal 117. Software product 1000 includes machine-readable instructions 133 of FIG. 1. Machine-readable instructions 133 include logarithm transformation instructions 1021, that when executed by the processor 134, cause the processor to apply the logarithm function 212 to the measured transmission spectrum 111 recorded for the sample 102 by the spectrometer 101 to form the intermediate spectrum 213. The free-induction-decay transformation instructions 1022, when executed by the processor 134 cause the processor to apply an inverse Fourier transform 214 to the intermediate spectrum 213 to generate m-FID signal 215. The weighting instructions 1023, when executed by the processor 134 cause the processor 134 to weight with the weighting function 216 the m-FID signal 215 to suppress at least an early temporal portion 710 of the m-FID signal 215 to generate the baseline-suppressed m-FID signal 117.

The weighting instructions 1023 further include instructions for determining the first cutoff time 1024 that, when executed by the processor 134, cause the processor 134 to determine the first cutoff time 601 by calculating a lowest time for which an average over the time window 810 of the m-FID signal 215 is less than 812 the threshold value 811. The weighting instructions 1023 further include instructions for determining the second cutoff time 1025 that, when executed by the processor 134, cause the processor 134 to determine the second cutoff time 602 at least partly from the m-FID signal 215. The weighting instructions 1023 further including instructions for periodic baseline suppression 1026 that, when executed by the processor 134, cause the processor 134 to suppress the periodic baseline contribution 910 to the measured transmission spectrum 111 by weighting down the corresponding temporal portion 920 of the m-FID signal 215.

The machine-readable instructions 133 further include fitting instructions 1027 that, when executed by the processor 134, cause the processor 134 to fit the model m-FID signal 523 to the baseline-suppressed m-FID signal 117 to derive one or more properties 150 of the sample 102.

The machine-readable instructions 133 further include model transformation instructions 1028 that, when executed by the processor 134, cause the processor 134 to generate the model m-FID signal 523 by applying the inverse Fourier transformation 214 to the model spectrum 512 that depends on one or more fitting parameters 550 respectively corresponding to one or more properties 150 of the sample 102.

The computer-readable media 1010 also includes data storage 1040 that contains data that may be used in conjunction with the machine-readable instructions 133. In an embodiment, data storage 1040 may include data corresponding to the measured transmission spectrum 111, the intermediate spectrum 213, and the m-FID signal 215, which includes at least an early temporal portion 710 and may further include at least the following temporal portion 720, the late temporal portion 730 and the temporal portion 920. In an embodiment, data storage 1040 includes data corresponding to the baseline-suppressed m-FID signal 117, the model m-FID signal 523, one or more properties 150 of the sample 102, the model spectrum 512, one or more fitting parameters 550, the residual m-FID signal 417, the residual spectrum 421, and the baseline-suppressed absorption spectrum 119. In an embodiment, data storage 1040 includes data corresponding to the weighting function 316 that may include at least the first weight 601, the first cutoff time 602, the second weight 603, an average over the time window 810, the threshold value 811, the third weight 605, and the second cutoff time 604.

Figure 11:
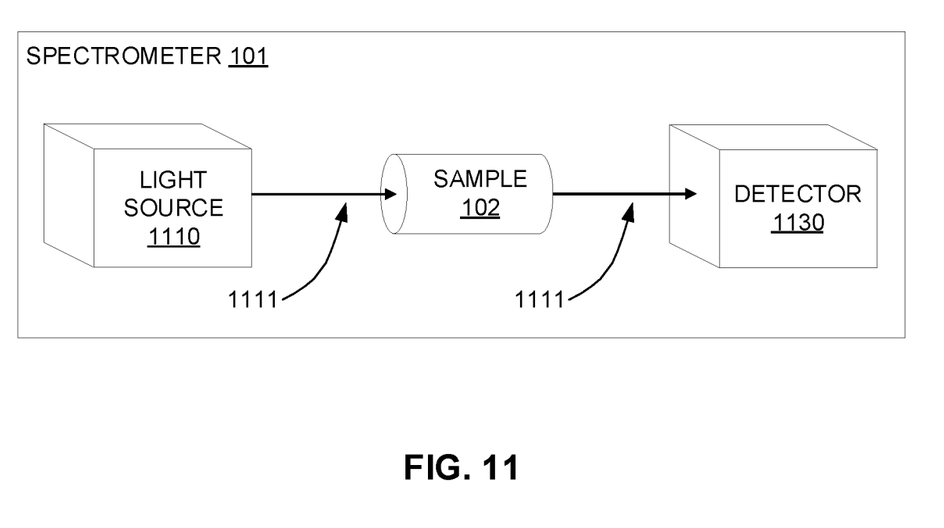
FIG. 11 illustrates, according to an embodiment, a spectrometer that includes at least a light source that emits light and further includes a detector.

FIG. 11 illustrates, according to an embodiment, the spectrometer 101 that includes at least a light source 1110 that emits light 1111 and further includes a detector 1130. Said light 1111 interacts with the sample 102 and the light 1111 then continues on to the detector 1130, where the intensity of light 1111 is measured. The intensity of the light 1111 will be diminished if the sample 102 absorbs light 1111.

Figure 12:
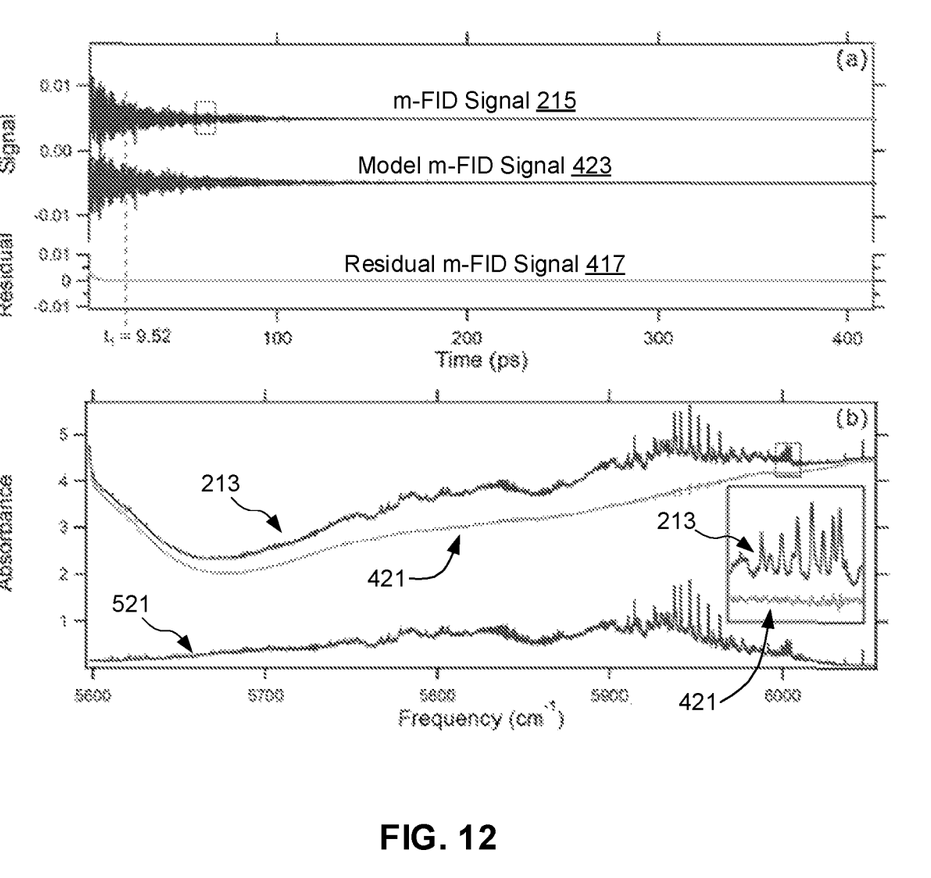

FIG. 12 (a) shows, according to an embodiment, the m-FID signal 215, the model m-FID signal 423 and the residual m-FID signal 417, each plotted with respect to a common time axis. FIG. 12 (b) shows, according to an embodiment, an intermediate spectrum 213, the residual spectrum 421, and the model spectrum 521, each plotted with respect to a common time axis. These traces are described in more detail below.

Example 1

We test method 200 for generating a baseline-suppressed modified free induction decay signal 117 by applying it to a quantitative measurement of an ethane-methane mixture, which absorbs continuously for more than 500 cm$^{-1}$ in the near-infrared. Accurately measuring concentration from this spectrum (and the spectra of other broadly absorbing gases) is challenging using existing analysis techniques. Because of the broadband absorption, a post-processing routine to fit the baseline of the ethane-methane spectrum would need to interpolate for more than 500 cm$^{-1}$. This makes the modeled baseline particularly sensitive to errors in the spectral model, since a traditional frequency-domain fit to this mixture would almost certainly require the baseline and absorption model to be fit to the data simultaneously. Furthermore, the lack of non-absorbing regions makes it very difficult to identify baseline errors from unintended drift in the laser intensity spectrum or from poorly selected baseline model parameters. Regardless of the cause, errors in the baseline used to normalize the measured spectrum result directly in errors in the measured absorber concentrations. Because certain embodiments of the method 200 do not require any baseline correction, the method is particularly well-suited to applications involving broadly absorbing molecules.

The ethane-methane mixture used for this test is composed of 3.8±1% methane in a balance of 96.2±1.1% ethane. The uncertainty in the known mole fractions is primarily driven by the uncertainty of the pressure transducer used to create the mixture (0.5% of reading). We create the mixture by filling a stainless-steel mixing tank while monitoring the pressure using a calibrated capacitance manometer. Before filling the 453±4 mm quartz optical cell, we agitate the mixture with stainless steel ball bearings in the mixing tank to ensure uniformity. We measure the transmission spectrum of the mixture at 297.5±2.2 K and 630.8±3.2 Torr pressure using a near-infrared dual comb spectrometer with 0.0066 cm$^{-1}$ point spacing and coherent averaging for 90 minutes. The pressure and temperature of the mixture remain stable for the duration of the measurement.

We supply the parameter fitting algorithm 530 with an initial guess for the mixture composition 515 of 2% methane, while the temperature 513 and pressure 511 are fixed at the known experimental values. FIG. 12 (a) shows the model m-FID signal 423 and the m-FID signal 215 in the time domain. FIG. 12 (b) shows the results of parameter fitting algorithm in the frequency domain, which are obtained through the Fourier transform 318 of m-FID signal 215 and model m-FID signal 423 in panel (a). In FIG. 12 panel (b), the frequency-domain view of the results of the parameter fitting algorithm 530 shows how the method 200 is able to separate the molecular response from the residual spectrum 421. Here, the model absorption spectrum 521 is generated using the optimized values derived for the one or more fitting parameters 550 generated by the parameter fitting algorithm 530 (which includes no baseline or laser intensity parameters) that has been fit to the baseline-suppressed m-FID signal 117. The residual spectrum 421 is composed of the laser baseline along with any differences between the model m-FID signal 423 and the m-FID signal 215. As such, FIG. 12 panel (b) shows an interesting side effect of the fact that the method 200 does not require or take into account the residual spectrum 421 in the parameter fitting algorithm 530 or the modeling procedure 420. The fit residual is an interesting (and potentially useful) way of measuring the source intensity baseline or assessing model-data mismatch. The latter includes both the ability to assess the accuracy of modeling procedure 420 or to determine whether the model spectrum 521 is accounting for all of the molecules that are present in the measured transmission spectrum 111 (e.g. the measured transmission spectrum of any molecules not included in the modeling procedure 420 would be present in the residual m-FID signal 417).

Without any regard for the residual spectrum 421, the parameter fitting algorithm 530 converges on a composition measurement of 3.4±0.1% methane and 96.6±0.1% ethane, both of which are well within the uncertainty of the known experimental mixture. The uncertainties in the one or more properties 150 of the sample 102 are derived from the uncertainty reported by the parameter fitting algorithm 530 combined in quadrature with the uncertainty from the pressure, temperature, and path length values that were held constant in the modeling procedure 420. To assess this latter component of the uncertainty, we performed different fits while changing values for the pressure 511, temperature 513, and path length within their experimental uncertainties. We use the range in the ethane and methane mole fractions measured using this approach to define this component of the fit uncertainty.

COMBINATIONS OF FEATURES

Features described above as well as those claimed below may be combined in various ways without departing from the scope hereof. For example, it will be appreciated that aspects of one method, product, or system for baseline-free absorption spectroscopy, described herein, may incorporate or swap features of another method, product, or system for baseline-free absorption spectroscopy described herein. It should be clear that many changes and modifications may be made to the methods, products, and systems herein without departing from the spirit and scope of this invention.

Changes may be made in the above systems, products, and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems, products, and methods, which, as a matter of language, might be said to fall therebetween.

What is claimed is:

1. A method for baseline-free absorption spectroscopy, comprising:
    recording a measured transmission spectrum using one or more of a dual-comb spectrometer, a Fourier transform spectrometer, a cavity-enhanced spectrometer, a grating spectrometer, a dispersive spectrometer, a tunable laser spectrometer, and a hyperspectral imaging system;
    applying a logarithmic function to the measured transmission spectrum of a sample to form an intermediate spectrum;
    generating a modified free-induction-decay (m-FID) signal by applying an inverse Fourier transform to the intermediate spectrum; and
    weighting the m-FID signal with a weighting function to suppress at least an early temporal portion of the m-FID signal subject to baseline effects, to generate a baseline-suppressed m-FID signal.

2. The method of claim 1, further comprising fitting a model m-FID signal to the baseline-suppressed m-FID signal to derive one or more properties of the sample.

3. The method of claim 2, further comprising generating the model m-FID signal by applying an inverse Fourier transformation to a model spectrum that depends on one or more fitting parameters corresponding to the one or more properties of the sample.

4. The method of claim 2, the one or more properties of the sample being selected from the group consisting of pressure, temperature, concentration, number density, line strength, transition frequency, path length, Doppler width, and molecular velocity.

5. The method of claim 2, wherein said fitting comprises generating a residual m-FID signal representative of a difference between the baseline-suppressed m-FID signal and the model m-FID signal as fitted to the baseline-suppressed m-FID signal.

6. The method of claim 1, further comprising at least partly deriving the weighting function from the m-FID signal.

7. The method of claim 6, wherein:
    the weighting function has (i) a first weight for an early temporal portion of the m-FID signal corresponding to times less than a first cutoff time and (ii) a second weight for a following temporal portion of the m-FID signal associated with a time range beginning at the first cutoff time; and
    said weighting further comprises determining the first cutoff time by calculating a lowest time for which an average over a time window of the m-FID signal is less than a threshold value.

8. The method of claim 7, the weighting function further having a third weight for a late temporal portion of the m-FID signal corresponding to times greater than a second cutoff time that is later than the first cutoff time, the third weight being less than the second weight.

9. The method of claim 1, wherein said weighting further comprises suppressing a late temporal portion of the m-FID signal associated with a low signal-to-noise ratio.

10. The method of claim 1, wherein said weighting further comprises suppressing a periodic baseline contribution to the measured transmission spectrum by reducing the weight corresponding to a temporal portion of the m-FID signal.

11. The method of claim 1, further comprising outputting the baseline-suppressed m-FID signal.

12. A software product for baseline-free absorption spectroscopy, comprising computer-readable media storing machine-readable instructions including:
    logarithmic transformation instructions that, when executed by a processor, cause the processor to apply a logarithmic function to a measured transmission spectrum of a sample to form an intermediate spectrum;
    free-induction-decay transformation instructions that, when executed by the processor, cause the processor to apply an inverse Fourier transform to the intermediate spectrum to generate a modified free-induction-decay (m-FID) signal; and
    weighting instructions that, when executed by the processor, cause the processor to weight with a weighting function the m-FID signal to suppress at least an early temporal portion of the m-FID signal subject to baseline effects, so as to generate a baseline-suppressed m-FID signal;

wherein the measured transmission spectrum is recorded by a spectrometer that includes at least one of a dual-comb spectrometer, a Fourier transform spectrometer, a cavity-enhanced spectrometer, a grating spectrometer, a dispersive spectrometer, a tunable laser spectrometer, and a hyperspectral imager.

13. The software product of claim 12, the machine-readable instructions further including fitting instructions that, when executed by a processor, cause the processor to fit a model m-FID signal to the baseline-suppressed m-FID signal to derive one or more properties of the sample.

14. The software product of claim 13, the machine-readable instructions further including model transformation instructions that, when executed by a processor, cause the processor to generate the model m-FID signal by applying an inverse Fourier transformation to a model spectrum that depends on one or more fitting parameters respectively corresponding to the one or more properties of the sample.

15. The software product of claim 12, the weighting function having (i) a first weight for an early temporal portion of the m-FID signal corresponding to times less than a first cutoff time and (ii) a second weight for a following temporal portion of the m-FID signal associated with a time range beginning at the first cutoff time, the weighting instructions further including instructions that, when executed by the processor, cause the processor to determine the first cutoff time by calculating a lowest time for which an average over a time window of the m-FID signal is less than a threshold value.

16. The software product of claim 15, the weighting function further having a third weight for a late temporal portion of the m-FID signal corresponding to times greater than a second cutoff time that is later than the first cutoff time, the third weight being less than the second weight.

17. The software product of claim 12, the weighting instructions further including instructions for periodic baseline suppression that, when executed by a processor, suppress a periodic baseline contribution to the measured transmission spectrum by weighting down a corresponding temporal portion of the m-FID signal.

18. A system for baseline-free absorption spectroscopy, comprising:
a spectrometer for recording a transmission spectrum of a sample;
a memory storing the software product of claim 12; and
a processor for executing the machine-readable instructions of the software product to generate the baseline-suppressed m-FID signal from the transmission spectrum, as recorded by the spectrometer.

19. The software product of claim 12, the machine-readable instructions further including output instructions that, when executed by the processor, cause the processor to output the baseline-suppressed m-FID signal.

* * * * *